US012124204B2

(12) United States Patent
Yamashita

(10) Patent No.: US 12,124,204 B2
(45) Date of Patent: Oct. 22, 2024

(54) CLEANING BLADE, CLEANING DEVICE, PROCESS CARTRIDGE, AND IMAGE FORMING APPARATUS

(71) Applicant: FUJIFILM Business Innovation Corp., Tokyo (JP)

(72) Inventor: Yoshiro Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/363,831

(22) Filed: Aug. 2, 2023

(65) Prior Publication Data

US 2024/0264560 A1 Aug. 8, 2024

(30) Foreign Application Priority Data

Jan. 30, 2023 (JP) ................................ 2023-012292

(51) Int. Cl.
*G03G 21/00* (2006.01)

(52) U.S. Cl.
CPC . *G03G 21/0017* (2013.01); *G03G 2221/0089* (2013.01)

(58) Field of Classification Search
CPC .................. G03G 21/0017; G03G 2221/0089
See application file for complete search history.

(56) References Cited

U.S. PATENT DOCUMENTS

2004/0170841 A1* 9/2004 Tomiyama ......... G03G 21/0017 428/422.8
2014/0255070 A1* 9/2014 Tano .................. G03G 21/0017 399/350
2016/0124376 A1* 5/2016 Ito ...................... G03G 21/0017 15/236.01
2022/0382206 A1* 12/2022 Kojima .............. G03G 21/0017

FOREIGN PATENT DOCUMENTS

JP 05-046056 A 2/1993
JP 2005-181434 A 7/2005
JP 2007-114373 A 5/2007

* cited by examiner

*Primary Examiner* — Sandra Brase
(74) *Attorney, Agent, or Firm* — Sughrue Mion, PLLC

(57) ABSTRACT

In a cleaning blade, a contact portion that comes into contact with a member to be cleaned is configured with a cured substance of a composition containing a polyisocyanate, a polyol, and at least one of the following (1) or (2):

(1) a fluorine-containing surfactant having a hydroxyl group, and (2) a fluorine-containing polymer having a hydroxyl value of 50 KOH mg/g or more and 300 KOH mg/g or less.

20 Claims, 5 Drawing Sheets

CLEANING BLADE, CLEANING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2023-012292 filed Jan. 30, 2023.

BACKGROUND

(i) Technical Field

The present invention relates to a cleaning blade, a cleaning device, a process cartridge, and an image forming apparatus.

(ii) Related Art

In the related art, in electrophotographic copy machines, printers, facsimile machines, and the like, a cleaning blade is used as a cleaning means for removing residual toner or the like on the surface of an image holder such as a photoreceptor.

For example, JP2005-181434A discloses "a cleaning blade formed of a polyurethane resin that rubs a toner remaining on an image carrier to remove the toner, in which a portion of the cleaning blade that includes at least an edge portion and comes into contact with the image carrier is impregnated with a fluorine-modified isocyanate compound and cured".

For example, JP1993-46056A discloses "a cleaning blade of a cleaning device obtained by forming a resin film that consists of a fluororesin containing 1% to 25% by weight of carbon fluoride on a surface of an elastic thin plate and".

For example, JP2007-114373A discloses "a cleaning device that removes a toner remaining on an image carrier of an image forming apparatus, in which in a member of the cleaning device that touches or comes into contact with the image carrier, a resin layer containing a fluororesin crosslinked by irradiation with electron beams in an inert gas atmosphere (hereinafter, called "crosslinked fluororesin") is formed in a portion that touches or comes into contact with the image carrier".

SUMMARY

In a case where the cleaning blade of the related art is brought into contact a member to be cleaned to clean the surface of the member to be cleaned, due to the friction between the member to be cleaned and the cleaning blade, streaky image defects tend to occur. Aspects of non-limiting embodiments of the present disclosure relate to a cleaning blade that further suppresses streaky image defects resulting from the friction between a member to be cleaned and the cleaning blade, compared to a cleaning blade in which a contact portion that comes into contact with a member to be cleaned is configured with a cured substance of a composition containing a polyisocyanate, a polyol, and the following (1) or (2).

(1) A fluorine-containing surfactant that does not have a hydroxyl group.

(2) A fluorine-containing polymer having a hydroxyl value less than 50 KOH mg/g or more than 300 KOH mg/g.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Means for addressing the above problems include the following aspect.

According to an aspect of the present disclosure, there is provided a cleaning blade in which a contact portion that comes into contact with a member to be cleaned is configured with a cured substance of a composition containing a polyisocyanate, a polyol, and at least one of the following (1) or (2):

(1) a fluorine-containing surfactant having a hydroxyl group, and (2) a fluorine-containing polymer having a hydroxyl value of 50 KOH mg/g or more and 300 KOH mg/g or less.

BRIEF DESCRIPTION OF THE DRAWINGS

Exemplary embodiment(s) of the present invention will be described in detail based on the following figures, wherein.

DETAILED DESCRIPTION

Figure 1:
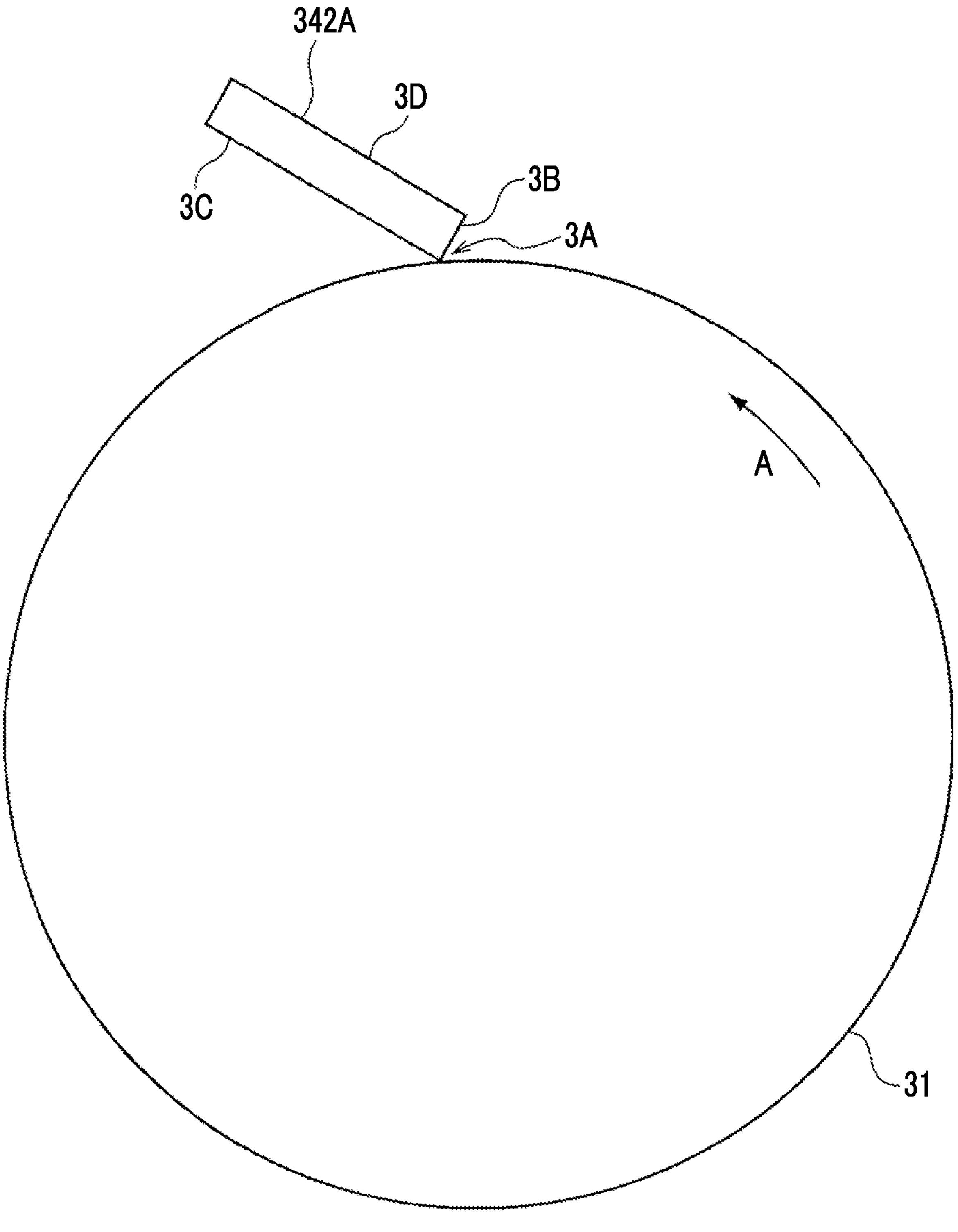
FIG. 1 is a schematic view showing an example of a cleaning blade according to the present exemplary embodiment.

Hereinafter, exemplary embodiments that are examples of the present disclosure will be described. The following descriptions and examples merely illustrate the exemplary embodiments, and do not limit the scope of the present disclosure.

In the present disclosure, a range of numerical values described using "to" represents a range including the numerical values listed before and after "to" as the minimum value and the maximum value respectively.

Regarding the ranges of numerical values described in stages in the present disclosure, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, in a case where there is a plurality of substances corresponding to each component in a composition, unless otherwise specified, the amount of each component in the composition means the total amount of the plurality of substances existing in the composition.

In the present disclosure, each component may include two or more kinds of corresponding particles. In a case where there are two or more kinds of particles corresponding to each component in a composition, unless otherwise specified, the particle size of each component means a value for a mixture of two or more kinds of the particles present in the composition.

In the present disclosure, for example, a combination of two or more preferred aspects is a more preferred aspect.

As for the description of groups (atomic groups) in the present disclosure, a group having no description regarding whether the group is substituted or unsubstituted includes both the group having no substituent and the group having a substituent.

In the present disclosure, the term "layer" includes a layer that is found to be formed in the entirety of a region where the layer exists in a case where the region is observed and a layer that is found to be formed only in a portion of the region.

In the present disclosure, unless otherwise specified, an alkyl group and a perfluoroalkyl group include all of linear, branched, and cyclic alkyl and perfluoroalkyl groups respectively.

Cleaning Blade

The cleaning blade according to the present exemplary embodiment is a cleaning blade in which a contact portion that comes into contact with a member to be cleaned is configured with a cured substance of a composition containing a polyisocyanate, a polyol, and at least one of the following (1) or (2):

(1) a fluorine-containing surfactant having a hydroxyl group, and (2) a fluorine-containing polymer having a hydroxyl value of 50 KOH mg/g or more and 300 KOH mg/g or less.

In the related art, a cleaning blade in which a contact portion that comes into contact with a member to be cleaned is configured with a cured substance of a composition containing only a polyisocyanate and a polyol generates a high frictional force with the member to be cleaned. Accordingly, abrasion is likely to occur, the blade tip is pulled in much, and a toner tends to easily slip through the blade. As a result, in a case where the cleaning blade of the related art is used, a phenomenon is observed where the toner remaining on the member to be cleaned causes streaky image defects without being cleaned.

On the other hand, having the above configuration, the cleaning blade according to the present exemplary embodiment suppresses the streaky image defects resulting from the friction between a member to be cleaned and the cleaning blade.

In the cleaning blade according to the present exemplary embodiment, a contact portion that comes into contact with a member to be cleaned is configured with a cured substance of a composition containing at least one of the above (1) or (2) in addition to a polyisocyanate and a polyol. A fluorine-containing surfactant having a hydroxyl group and a fluorine-containing polymer having a predetermined hydroxyl value can react with a polyisocyanate and a polyol to form a cured substance of polyurethane. Therefore, for example, compared to a cleaning blade in which the contact portion is coated with a fluorine-containing surfactant and a fluorine-containing polymer having a predetermined hydroxyl value, the cleaning blade according to the present exemplary embodiment is more likely to maintain a slippery surface and further suppresses the friction between a member to be cleaned and the cleaning blade even being used over time. As a result, the friction between the member to be cleaned and the cleaning blade is suppressed, and streaky image defects are suppressed.

The cleaning blade according to the present exemplary embodiment may be a cleaning blade in which a contact portion that comes into contact with a member to be cleaned is configured with a cured substance of a composition containing at least one of the following (1) or (2) in addition to a polyisocyanate and a polyol, a cleaning blade in which a contact portion that comes into contact with a member to be cleaned is configured with a cured substance of a composition containing a polyisocyanate, a polyol, and the following (1), a cleaning blade in which a contact portion that comes into contact with a member to be cleaned is configured with a cured substance of a composition containing a polyisocyanate, a polyol, and the following (2), or a cleaning blade in which a contact portion that comes into contact with a member to be cleaned is configured with a cured substance of a composition containing a polyisocyanate, a polyol, and both the following (1) and (2):

(1) a fluorine-containing surfactant having a hydroxyl group, and (2) a fluorine-containing polymer having a hydroxyl value of 50 KOH mg/g or more and 300 KOH mg/g or less.

Hereinafter, the fluorine-containing surfactant having a hydroxyl group will be also called a specific fluorine-containing surfactant.

Hereinafter, a fluorine-containing polymer having a hydroxyl value of 50 KOH mg/g or more and 300 KOH mg/g or less will be also called a specific fluorine-containing polymer.

Configuration of Cleaning Blade

In the cleaning blade according to the present exemplary embodiment, a contact portion that comes into contact with a member to be cleaned may have a member (hereinafter, called "contact member") configured with a cured substance of a composition containing a polyisocyanate, a polyol, and at least one of the (1) or (2) described above, in at least a contact portion that comes into contact with the member to be cleaned. That is, the cleaning blade may be configured with two layers including a first layer that consists of a contact member and comes into contact with the surface of a member to be cleaned and a second layer that is provided on the back surface of the first layer as a back surface layer, or may be configured with three or more layers. In addition, the cleaning blade may have a configuration in which only the corner portion of a portion that comes into contact with a member to be cleaned consists of a contact member while the periphery thereof consists of other materials.

Next, the configuration of the cleaning blade according to the present exemplary embodiment will be more specifically described using drawings.

FIG. 1 is a schematic view showing an example of the cleaning blade according to the present exemplary embodiment, which illustrates a state where the cleaning blade comes into contact with the surface of a member to be cleaned (for example, an image holder).

Figure 2:
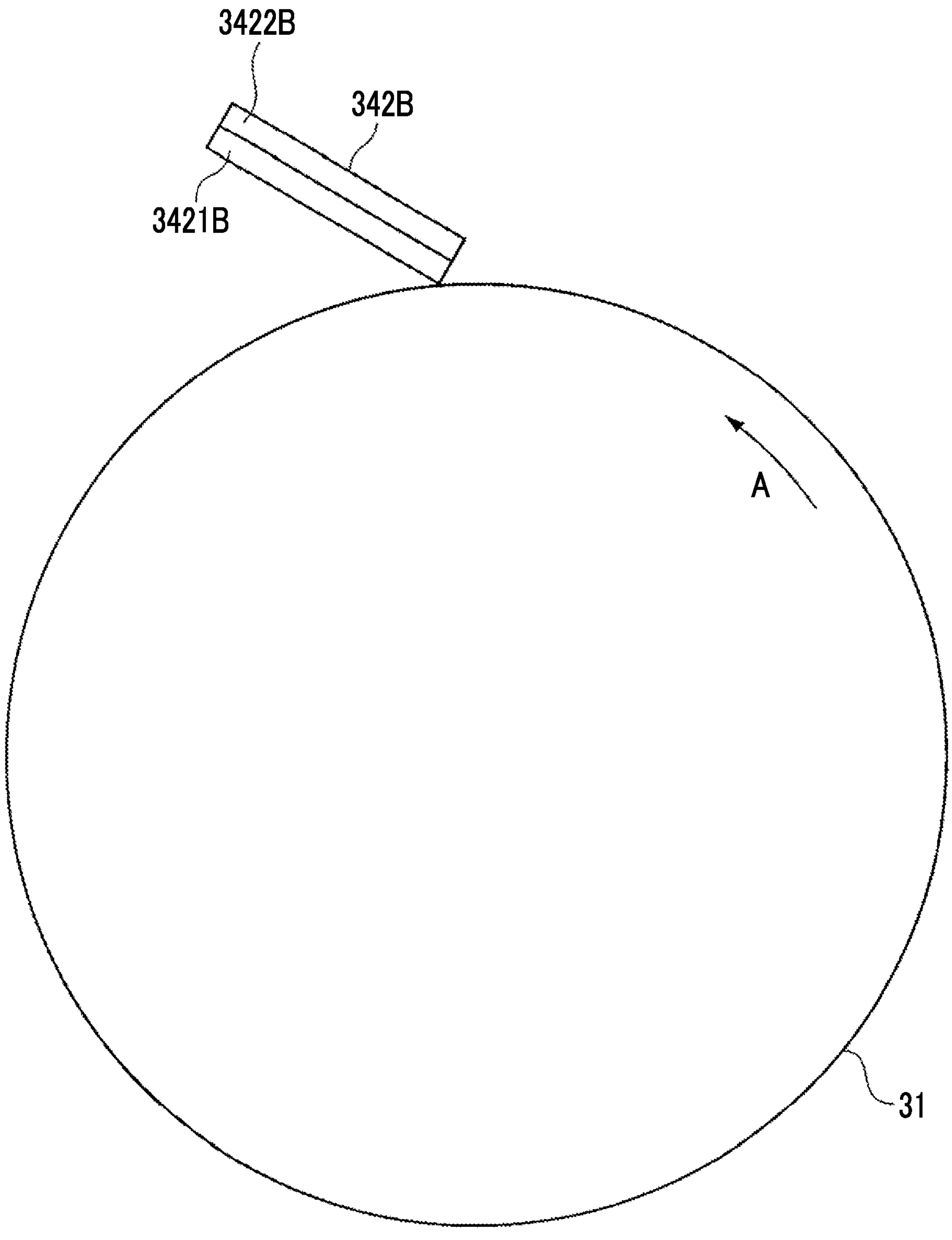
FIG. 2 is a schematic view showing another example of the cleaning blade according to the present exemplary embodiment.

FIG. 2 is a view showing a state where an example of the cleaning blade according to the present exemplary embodiment comes into contact with the surface of a member to be cleaned (for example, an image holder).

Figure 3:
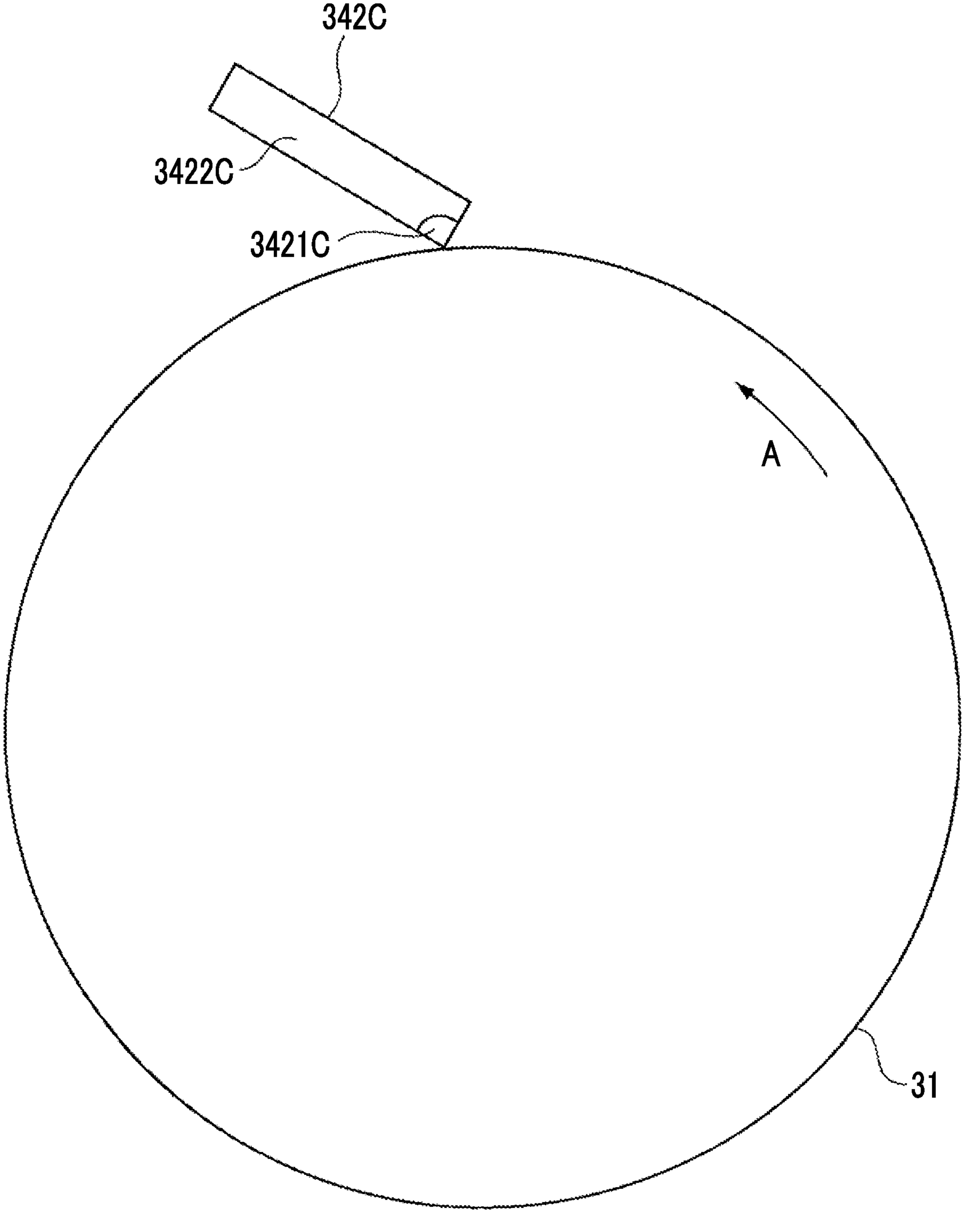
FIG. 3 is a schematic view showing another example of the cleaning blade according to the present exemplary embodiment.

FIG. 3 is a view showing a state where an example of the cleaning blade according to the present exemplary embodiment comes into contact with the surface of a member to be cleaned (for example, an image holder).

Each part of the cleaning blade will be described using FIG. 1.

As shown in FIG. 1, the cleaning blade has a contact portion (contact corner portion) 3A that comes into contact with a driven image holder (photoreceptor drum) 31 to clean the surface of the image holder 31, a tip surface 3B that includes the contact corner portion 3A as one side thereof and faces the upstream side in the driving direction (the direction of an arrow A), a front surface 3C that includes the contact corner portion 3A as one side thereof and faces the downstream side in the driving direction (the direction of the arrow A), and a back surface 3D that shares one side with the tip surface 3B and faces the front surface 3C.

The direction parallel to the contact corner portion 3A is called a depth direction, the direction along which the tip surface 3B extends from the contact corner portion 3A is called a thickness direction, and the direction along which the front surface 3C extends from the contact corner portion 3A is called a width direction.

The entirety of a cleaning blade 342A shown in FIG. 1 is configured with a single material, including the portion (contact corner portion) 3A that comes into contact with a photoreceptor drum 31. That is, the cleaning blade 342A has an aspect in which the cleaning blade 342A consists of only a contact member.

In a case where the cleaning blade according to the present exemplary embodiment is configured with only the contact member just as the cleaning blade 342A in FIG. 1, even though the cleaning blade is used over time, the surface of the cleaning blade is likely to be kept slippery, and the friction between a member to be cleaned and the cleaning blade remains suppressed. As a result, the friction between the member to be cleaned and the cleaning blade is suppressed, and streaky image defects are suppressed.

As in the exemplary embodiment shown in FIG. 2, the cleaning blade according to the present exemplary embodiment may be configured with two layers including a first layer 3421B that includes a portion (contact corner portion) 3A coming into contact with the photoreceptor drum 31, is formed over the entire surface of the front surface 3C side, and consists of a contact member, and a second layer 3422B as a back surface layer that is formed on the back surface 3D side of the first layer and consists of a material different from the contact member.

In a case where the cleaning blade according to the present exemplary embodiment is configured with two layers including the contact member and the back surface layer just as the cleaning blade in FIG. 2, for example, a thickness ratio between the contact member and the back surface layer is preferably in a range of 1:9 to 9:1. In a case where the ratio is in the above range, the contact member exerts an effect of suppressing friction with the member to be cleaned, the effect being a feature of the contact member, while the back surface layer functions to control the characteristics of the entire blade.

As in the exemplary embodiment shown in FIG. 3, the cleaning blade according to the present exemplary embodiment may be configured with a contact member (edge member) 3421C consisting of a contact member which includes a portion coming into contact with the photoreceptor drum 31, that is, the contact corner portion 3A, and has the shape of, for example, a quarter cylinder extending in the depth direction, and in which the portion of a rectangular corner of the shape forms the contact corner portion 3A, and a back surface member 3422C which covers the sides opposite to the back surface 3D side of the contact member 3421C in the thickness direction and the tip surface 3B of the contact member 3421C in the width direction, that is, configures portions other than the contact member 3421C and consists of a material different from the contact member.

In a case where the cleaning blade according to the present exemplary embodiment is configured with the contact member (edge member) 3421C and the back surface layer 3422C which is another region just as the cleaning blade in FIG. 3, a ratio of a partial contact member (edge member) to the total volume of the blade including an edge that comes into contact with a member to be cleaned, the edge extending in parallel with the tip surface 3B to the back surface 3D side from the boundary portion between the contact member and the back surface layer on the front surface 3C side shown in FIG. 1, is, for example, preferably 20% by volume or more, more preferably 30% by volume or more, and even more preferably 50% by volume or more. In a case of the ratio is equal to or more the above range, even though the cleaning blade is used over time, the surface of the cleaning blade is likely to be kept slippery, and the friction between the member to be cleaned and the cleaning blade remains suppressed. As a result, the friction between the member to be cleaned and the cleaning blade is suppressed, and streaky image defects are suppressed.

In FIG. 3, a member having the shape of a quarter cylinder is illustrated as an example of the contact member. However, the present exemplary embodiment is not limited thereto. The contact member may have, for example, the shapes of a quarter elliptical cylinder, a square prism, a rectangular prism, a right triangular prism, and the like.

Usually, the cleaning blade is used by being bonded to a rigid plate-shaped supporting material.

Composition

In the cleaning blade according to the present exemplary embodiment, the contact portion that comes into contact with a member to be cleaned is configured with a cured substance of a composition containing a polyisocyanate, a polyol, and at least one of the following (1) or (2). As necessary, the composition may further contain other materials in addition to the polyisocyanate, the polyol, and the following (1) and (2).

(1) A fluorine-containing surfactant having a hydroxyl group.

(2) A fluorine-containing polymer having a hydroxyl value of 50 KOH mg/g or more and 300 KOH mg/g or less.

The cleaning blade according to the present exemplary embodiment is, for example, preferably a cleaning blade in which a contact portion that comes into contact with a member to be cleaned is configured with a cured substance of a composition containing a polyisocyanate, a polyol, the above (1) which is in other words a fluorine-containing surfactant having a hydroxyl group.

In a case where the cleaning blade is a cured substance of a composition containing the above (1), even in a harsher environment (for example, even in a case where a member to be cleaned is cleaned 100,000 times or more with the cleaning blade at 30° C. and 85% RH), the friction between the member to be cleaned and the cleaning blade is kept low, which further suppresses streaky image defects.

Specific Fluorine-Containing Surfactant

The specific fluorine-containing surfactant is a fluorine-containing surfactant having a hydroxyl group.

Examples of the specific fluorine-containing surfactant include compounds having a fluoroalkyl or fluoroalkylene group in at least a moiety of a main chain, a side chain, and a terminal. Specifically, examples thereof include known fluorine-containing surfactants such as a compound having a low carbon number perfluoroalkyl group having 6 or less carbon atoms, a perfluoroalkyl carboxylate, a perfluoroalkyl sulfonate, a perfluoroalkyl ethylene oxide, a perfluoroalkyl amine compound, and a perfluoroalkyl betaine. Among the above, as the specific fluorine-containing surfactant, from the viewpoint of lubricity, for example, at least one compound selected from the group consisting of a compound having a low carbon number perfluoroalkyl group having 6 or less carbon atoms, a perfluoroalkyl ethylene oxide, and a perfluoroalkyl alcohol is preferable. One specific fluorine-containing surfactant may be used alone, or two or more specific fluorine-containing surfactants may be used in combination.

The content of the specific fluorine-containing surfactant with respect to the polyisocyanate is, for example, preferably 0.01% by mass or more, more preferably 0.03% by mass or more and 5.00% by mass or less, and even more preferably 0.05% by mass or more and 3.00% by mass or less.

In a case where the content of the specific fluorine-containing surfactant is 0.01% by mass or more, the friction between a member to be cleaned and the cleaning blade is kept low, and streaky image defects are further suppressed.

In a case where the content of the specific fluorine-containing surfactant is 5.00% by mass or less, the occurrence of problems such as uneven curing of the composition is suppressed in a case where the composition is made into a cured substance. In addition, the cleaning blade is inhibited from being curled due to an excessive reduction of the frictional force of the cleaning blade, which further suppresses the streaky image defects.

Specific Fluorine-Containing Polymer

The specific fluorine-containing polymer is a fluorine-containing polymer having a hydroxyl value of 50 KOHmg/g or more and 300 KOHmg/g or less. The specific fluorine-containing polymer is, for example, preferably a fluorine-containing polymer having a hydroxyl value of 100 KOHmg/g or more and 250 KOHmg/g or less, and more preferably a fluorine-containing polymer having a hydroxyl value of 130 KOHmg/g or more and 200 KOH mg/g or less.

The hydroxyl value is measured according to the method A of ISO14900.

The specific fluorine-containing polymer is, for example, preferably a (meth)acrylic copolymer having a constitutional unit derived from an alkyl (meth)acrylate, a constitutional unit derived from a hydroxyalkyl (meth)acrylate, and a constitutional unit derived from a perfluoroalkyl (meth)acrylate. One specific fluorine-containing polymer may be used alone, or two or more specific fluorine-containing polymers may be used in combination.

In a case where the specific fluorine-containing polymer is a copolymer having the above constitutional units, when the composition containing the copolymer is made into a cured substance, the surface of the cleaning blade is more likely to be slippery, and the friction between a member to be cleaned and the cleaning blade is further suppressed.

In the present specification, “a constitutional unit derived from an alkyl (meth)acrylate” means a constitutional unit formed by addition polymerization of an alkyl (meth)acrylate.

In the present specification, the descriptions such as “(meth)acrylate” are expressions including both acrylate and methacrylate (methacrylate).

Examples of the alkyl (meth)acrylate include methyl (meth)acrylate, ethyl (meth)acrylate, n-butyl (meth)acrylate, i-butyl (meth)acrylate, s-butyl (meth)acrylate, t-butyl (meth) acrylate, n-octyl (meth)acrylate, i-octyl (meth)acrylate, 2-ethylhexyl (meth)acrylate, n-nonyl (meth)acrylate, i-nonyl (meth)acrylate, n-decyl (meth)acrylate, n-dodecyl (meth)acrylate, stearyl (meth)acrylate, lauryl (meth)acrylate, cyclohexyl (meth)acrylate, isobornyl (meth)acrylate, and the like. On alkyl (meth)acrylate may be used alone, or two or more alkyl (meth)acrylates may be used in combination.

In the present specification, “a constitutional unit derived from a hydroxyalkyl (meth)acrylate” means a constitutional unit formed by addition polymerization of a hydroxyalkyl (meth)acrylate.

Examples of the hydroxyalkyl (meth)acrylate include hydroxyethyl methacrylate (HEMA), hydroxypropyl acrylate (HPA), hydroxypropyl methacrylate (HPMA), and the like. One hydroxyalkyl (meth)acrylate may be used alone, or two or more hydroxyalkyl (meth)acrylates may be used in combination.

In the present specification, “a constitutional unit derived from a perfluoroalkyl (meth)acrylate” means a constitutional unit formed by addition polymerization of a perfluoroalkyl (meth)acrylate.

Examples of the perfluoroalkyl (meth)acrylate include 2-(perfluorobutyl)ethyl acrylate, 2-(perfluorohexyl)ethyl acrylate, 2-(perfluorohexyl)ethyl methacrylate, and the like. One perfluoroalkyl (meth)acrylate may be used alone, or two or more perfluoroalkyl (meth)acrylates may be used in combination.

In the specific fluorine-containing polymer, the ratio of the constitutional unit derived from a perfluoroalkyl (meth) acrylate to the all the constitutional units is, for example, preferably 1 mol % or more and 20 mol % or less, more preferably 3 mol % or more and 16 mol % or less, and even more preferably 5 mol % or more and 12 mol % or less.

In a case where the ratio of the constitutional unit derived from a perfluoroalkyl (meth)acrylate is 1 mol % or more, the friction between a member to be cleaned and the cleaning blade is kept low, and streaky image defects are further suppressed.

In a case where the ratio of the constitutional unit derived from a perfluoroalkyl (meth)acrylate is 20 mol % or less, the occurrence of problems such as uneven curing of the composition is suppressed in a case where the composition is made into a cured substance. In addition, the cleaning blade is inhibited from being curled due to an excessive reduction of the frictional force of the cleaning blade, which further suppresses the streaky image defects.

The content of the specific fluorine-containing polymer with respect to the polyisocyanate (specific fluorine-containing polymer/polyisocyanate×100) is, for example, preferably 0.05% by mass or more, more preferably 0.20% by mass or more and 20.00% by mass or less, and even more preferably 0.30% by mass or more and 10.00% by mass or less.

In a case where the content of the specific fluorine-containing polymer is 0.05% by mass or more, the friction between a member to be cleaned and the cleaning blade is kept low, and streaky image defects are further suppressed.

In a case where the content of the specific fluorine-containing polymer is 2.00% by mass or less, the occurrence of problems such as uneven curing of the composition is suppressed in a case where the composition is made into a cured substance. In addition, the cleaning blade is inhibited from being curled due to an excessive reduction of the frictional force of the cleaning blade, which further suppresses the streaky image defects.

Polyol

The polyol includes a high-molecular-weight polyol and a low-molecular-weight polyol.

The high-molecular-weight polyol is a polyol having a number-average molecular weight of 500 or more (for example, preferably 500 or more and 5,000 or less). Examples of the high-molecular-weight polyol include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

The number-average molecular weight is a value measured by gel permeation chromatography (GPC). The same shall apply hereinafter.

Each of the high-molecular-weight polyols may be used alone, or two or more high-molecular-weight polyols may be used in combination.

The polymerization ratio of the high-molecular-weight polyol to all the polymerization components of the polyurethane rubber may be, for example, 10 mol % or more and 70 mol % or less, and is preferably 20 mol % or more and 60 mol % or less.

The low-molecular-weight polyol is a polyol having a molecular weight (a number-average molecular weight) of less than 500. The low-molecular-weight polyol is a material that functions as a chain extender and a crosslinking agent.

As the low-molecular-weight polyol, 1,4-butanediol is used. The ratio of 1,4-butanediol to all polyols (high-molecular-weight polyol+low-molecular-weight polyol) is, for example, more than 50 mol % and 75 mol % or less (for example, preferably 52 mol % or more and 75 mol % or less, more preferably 55 mol % or more and 75 mol % or less, and even more preferably 55 mol % or more and 60 mol % or less).

In a case where the ratio of 1,4-butanediol is more than 50 mol %, local abrasion is suppressed. On the other hand, in a case where the ratio of 1,4-butanediol is 75% by mole or less, the occurrence of chipping is suppressed.

The ratio of 1,4-butanediol to all low-molecular-weight polyols is 80 mol % or more. For example, the ratio is preferably 90 mol % or more, and more preferably 100 mol %. That is, it is most preferable that all the low-molecular-weight polyols used be 1,4-butanediol.

Examples of the low-molecular-weight polyol also include a diol (difunctional), a triol (trifunctional), and a tetraol (tetrafunctional) which are well known as chain extenders and crosslinking agents, in addition to 1,4-butanediol.

Each of the polyols other than 1,4-butanediol may be used alone, or two or more such polyols may be used in combination.

The polymerization ratio of the low-molecular-weight polyol to all the polymerization components of the polyurethane rubber may be, for example, more than 0 mol % and 75 mol % or less, preferably 0.1 mol % or more and 75 mol % or less, more preferably 0.2 mol % or more and 75 mol % or less, and even more preferably 0.5 mol % or more and 60 mol % or less.

Polyisocyanate

Examples of the polyisocyanate include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4-diisocyanate (TODI).

As the polyisocyanate, for example, 4,4'-diphenylmethane diisocyanate (MDI), 1,5-naphthalene diisocyanate (NDI), and hexamethylene diisocyanate (HDI) are more desirable.

Each of the polyisocyanates may be used alone, or two or more polyisocyanates may be used in combination.

The polymerization ratio of the polyisocyanate to all the polymerization components of the polyurethane rubber may be, for example, 5 mol % or more and 50 mol % or less, and preferably 10 mol % or more and 40 mol % or less.

Polyurethane Rubber

The polyisocyanate and the polyol contained in the composition form polyurethane rubber.

It is preferable that the polyurethane rubber have, for example, a hard segment and a soft segment. In the polyurethane rubber material, “hard segment” means a segment that consists of a material relatively harder than a material configuring “soft segment”, and “soft segment” means a segment that consists of a material relatively softer than the material configuring “hard segment”.

Examples of the material configuring the hard segment (hard segment material) include a low-molecular-weight polyol among polyols, and a resin having a functional group capable of reacting with an isocyanate group of a polyisocyanate. On the other hand, examples of the material configuring the soft segment (soft segment material) include a high-molecular-weight polyol among polyols.

The average particle size of aggregates of the hard segment is, for example, preferably 1 μm or more and 10 μm or less, and more preferably 1 μm or more and 5 μm or less.

In a case where the average particle size of the aggregates of the hard segment is 1 μm or more, the frictional resistance of the surface of the contact member is likely to be reduced. Therefore, the behavior of the blade is stabilized, and local abrasion is likely to be suppressed.

On the other hand, in a case where the average particle size of the aggregates of the hard segment is 10 μm or less, the occurrence of chipping is likely to be suppressed.

The average particle size of the aggregates of the hard segment is measured as follows. By using a polarizing microscope (BX51-P manufactured by Olympus Corporation), an image is captured at 20× magnification, and image processing is performed to convert the image into a binary image. For each of 20 cleaning blades, particle sizes (equivalent circle diameters) of aggregates are measured at 5 spots (at each spot, particle sizes of 5 aggregates are measured), and the average particle size of the 500 aggregates is calculated.

To binarize the image, by using the image processing software OLYMPUS Stream essentials (manufactured by Olympus Corporation), the thresholds of color/chroma/luminance are adjusted such that crystalline portions and aggregates of the hard segment appear black and amorphous portions (corresponding to the soft segment) appear white.

Other Materials

As necessary, the composition may further contain other materials in addition to the polyisocyanate, the polyol, the fluorine-containing surfactant, and the fluorine-containing polymer. The aforementioned other materials may include, for example, a resin having a functional group capable of reacting with an isocyanate group of a polyisocyanate, a catalyst, and the like.

Resin Having Functional Group Capable of Reacting with Isocyanate Group

As the resin having a functional group capable of reacting with an isocyanate group (hereinafter, called "functional group-containing resin"), for example, a flexible resin is desirable, and an aliphatic resin having a linear structure is more desirable in view of flexibility. Specific examples of the functional group-containing resin include an acrylic resin containing two or more hydroxyl groups, a polybutadiene resin containing two or more hydroxyl groups, and an epoxy resin having two or more epoxy groups.

Examples of commercially available products of acrylic resins containing two or more hydroxyl groups include ACTFLOW manufactured by Soken Chemical & Engineering Co., Ltd. (grades: UMB-2005B, UMB-2005P, UMB-2005, UME-2005, and the like).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In view of physical properties, for example, an epoxy resin is preferable which has a lower viscosity for the molecular weight compared to the epoxy resins of the related art. Specifically, for example, an epoxy resin is desirable which has a weight-average molecular weight in a range of 900±100 and a viscosity at 25° C. in a range of 15,000±5,000 mPa·s, and an epoxy resin is more desirable which has a viscosity at 25° C. in a range of 15,000±3,000 mPa s. Examples of commercially available products of epoxy resins having such characteristics include EPICLON EXA-4850-150 manufactured by DIC Corporation.

The polymerization ratio of the functional group-containing resin may be, for example, in a range that does not impair the effect of the cleaning blade according to the present exemplary embodiment.

Catalyst

Examples of the catalyst include an amine-based compound such as a tertiary amine, a quaternary ammonium salt, and an organometallic compound such as an organotin compound.

Examples of the tertiary amine include a trialkylamine such as triethylamine, a tetraalkyldiamine such as N,N,N',N'-tetramethyl-1,3-butanediamine, an amino alcohol such as dimethylethanolamine, an ester amine such as an ethoxylated amine, an ethoxylated diamine, and bis(diethylethanolamine)adipate, triethylenediamine (TEDA), a cyclohexylamine derivative such as N,N-dimethylcyclohexylamines, a morpholine derivative such as N-methylmorpholine, N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium·octylate, 1,5-diazabicyclo[4.3.0]nonene-5 (DBN)·octylate, 1,8-diazabicyclo[5.4.0]undecene-7 (DBU)-octylate, DBU-oleate, DBU-p-toluenesulfonate, DBU-formate, and 2-hydroxypropyltrimethylammonium formate.

Examples of the organotin compound include a dialkyltin compound such as dibutyltin dilaurate or dibutyltin di(2-ethylhexanoate), stannous 2-ethylcaproate, and stannous oleate.

Among the above catalysts, in view of hydrolysis resistance, triethylenediamine (TEDA), which is a tertiary ammonium salt, is used. Furthermore, in view of processability, for example, a quaternary ammonium salt is used. Among the quaternary ammonium salts, for example, 1,5-diazabicyclo[4.3.0]nonene-5 (DBN)·octylate, 1,8-diazabicyclo[5.4.0]undecene-7 (DBU)-octylate, and DBU-formate, which are highly reactive, are used.

The content of the catalyst with respect to the entire cured substance configuring the contact member (more specifically, the polyurethane rubber obtained by reacting at least the polyisocyanate with the polyol) is, for example, preferably in a range of 0.0005% by mass or more and 0.03% by mass or less, and particularly preferably 0.001% by mass or more and 0.01% by mass or less. One catalyst may be used alone, or two or more catalysts may be used in combination.

Manufacturing Method of Cured Substance of Composition

For manufacturing the cured substance of the composition, a general polyurethane manufacturing method, such as a prepolymer method or a one-shot method, is used. With the prepolymer method, a cured substance excellently resistant to abrasion and chipping is obtained. Therefore, this method is suited for the present exemplary embodiment, but the present exemplary embodiment is not limited by the manufacturing method.

The cleaning blade is prepared by forming a composition for forming a cleaning blade prepared by the above method into a sheet by using, for example, centrifugal molding, extrusion molding, or the like and processing the sheet by cutting or the like.

Composition of Non-Contact Member

What will be described below is the composition of a non-contact member in a case where the cleaning blade according to the present exemplary embodiment has a non-contact member, that is, in a case where the contact member and a region other than the contact member (non-contact member) are configured with different materials as in the exemplary embodiment shown in FIG. 2 or the exemplary embodiment shown in FIG. 3.

Any of known materials can be used for the non-contact member without limitations, as long as the non-contact member has a function of supporting the contact member. Specifically, examples of the material used for the non-contact member include polyurethane rubber, silicon rubber, fluororubber, chloroprene rubber, butadiene rubber, and the like. Among these, for example, polyurethane rubber may be used. Examples of the polyurethane rubber include ester-based polyurethane and ether-based polyurethane. Among these, for example, ester-based polyurethane is particularly desirable.

Manufacturing of Cleaning Blade

The cleaning blade that consists of only the contact member shown in FIG. 1 is manufactured by a method of molding a contact member which is a cured substance of the composition described above.

The cleaning blade that is configured with a plurality of layers, such as two layers, shown in FIG. 2 is prepared by bonding a first layer as a contact member and a second layer as a non-contact member (a plurality of layers in a case where the cleaning blade is configured with three or more layers) to each other. As the bonding method, double-sided tape, various adhesives, and the like are used. Furthermore, during molding, materials of the respective layers may be poured into a mold with variations in time and allowed to be bonded to each other without providing an adhesive layer, such that a plurality of layers stick together.

In a case where the cleaning blade is configured with a contact member (edge member) and a non-contact member (back surface member) shown in FIG. 3, what will be prepared are a first mold that has a cavity (region into which the composition for forming a contact member is poured) corresponding to a semicylindrical shape which may be formed in a case where two contact members 3421C shown in FIG. 3 are stacked such that the front surface 3C sides come into contact with each other, and a second mold that has a cavity corresponding to a shape which may be formed in a case where two members, the contact member 3421C and the non-contact member 3422C, are stacked such that the front surface 3C sides come into contact with each other. The composition for forming a contact member is poured into the cavity of the first mold and cured, thereby forming a first molded substance having the shape two contact members 3421C stacked together. Next, the first mold is removed, and then the second mold is installed such that the first molded substance is arranged in the cavity of the second mold. Then, a composition for forming a non-contact member is poured into the cavity of the second mold to cover the first molded substance, and cured. In this way, a second molded substance is formed which has the shape of two contact members 3421C and two non-contact members 3422C that are stacked such that the front surface 3C sides come into contact with each other. Subsequently, the formed second molded substance is cut at the center, that is, cut along a portion to be the front surface 3C such that the semicylindrical contact member is cut at the center and have the shape of a quarter cylinder, and then further cut in a predetermined size, thereby obtaining the cleaning blade shown in FIG. 3.

Use of Cleaning Blade

In a case where a member to be cleaned is cleaned with the cleaning blade according to the present exemplary embodiment, the member to be cleaned as an object of cleaning is not particularly limited as long as the member to be cleaned is a member whose surface needs to be cleaned in an image forming apparatus. Examples of the member to be cleaned include an intermediate transfer member, a charging roll, a transfer roll, a transport belt for a material to be transferred, a paper transport roll, a detoning roll that further removes a toner from a cleaning brush that removes a toner from an image holder, and the like. In the present exemplary embodiment, the member to be cleaned is, for example, particularly desirably an image holder. In addition, the cleaning blade according to the present exemplary embodiment may be for cleaning members to be cleaned that are members other than the members for an image forming apparatus.

Cleaning Device, Process Cartridge, and Image Forming Apparatus

A cleaning device using the cleaning blade according to the present exemplary embodiment, a process cartridge, and an image forming apparatus will be described.

The cleaning device according to the present exemplary embodiment is not particularly limited, as long as the cleaning device includes the cleaning blade according to the present exemplary embodiment as a cleaning blade that comes into contact with the surface of a member to be cleaned to clean the surface of the member to be cleaned. For example, the cleaning device has a configuration including a transport member which fixes a cleaning blade in a cleaning case having an opening portion on the side of a member to be cleaned such that the tip of the edge is the opening portion side and guides a foreign substance, such as a waste toner, collected from the surface of the member to be cleaned by the cleaning blade to a foreign substance collecting container, and the like. In addition, two or more cleaning blades according to the present exemplary embodiment may be used in the cleaning device according to the present exemplary embodiment.

In a case where the cleaning blade of the present exemplary embodiment is used for cleaning an image holder, in order to suppress image flow during image formation, a force NF (Normal Force) by which the cleaning blade is pressed on the image holder is, for example, desirably in a range of 1.3 gf/mm or more and 2.3 gf/mm or less, and more desirably in a range of 1.6 gf/mm or more and 2.0 gf/mm or less.

A length of intrusion of the tip portion of the cleaning blade into the image holder is, for example, desirably in a range of 0.8 mm or more and 1.2 mm or less, and more desirably in a range of 0.9 mm or more and 1.1 mm or less.

An angle W/A (working angle) at the contact portion between the cleaning blade and the image holder is, for example, desirably in a range of 8° or more and 140 or less, and more desirably in a range of 10° or more and 12° or less.

The process cartridge of the present exemplary embodiment is not particularly limited as long as the process cartridge includes the cleaning device of the present exemplary embodiment, as a cleaning device that comes into contact with the surface of one or more members to be cleaned, such as an image holder and an intermediate transfer member, to clean the surface of the members to be cleaned. Examples of the process cartridge of the present exemplary embodiment include an aspect in which the process cartridge includes an image holder and the cleaning device of the present exemplary embodiment that cleans the surface of the image holder and is detachable from an image forming apparatus, and the like. For example, in a so-called tandem cartridge having image holders for toners of respective colors, the cleaning device of the present exemplary embodiment may be provided for each of the image holders. Furthermore, in addition to the cleaning device of the present exemplary embodiment, a cleaning brush or the like may also be used.

Specific Examples of Cleaning Blade, Image Forming Apparatus, and Cleaning Device Next, specific examples of the cleaning blade of the present exemplary embodiment and an image forming apparatus and a cleaning device that use the cleaning blade will be specifically described using a drawing.

Figure 4:
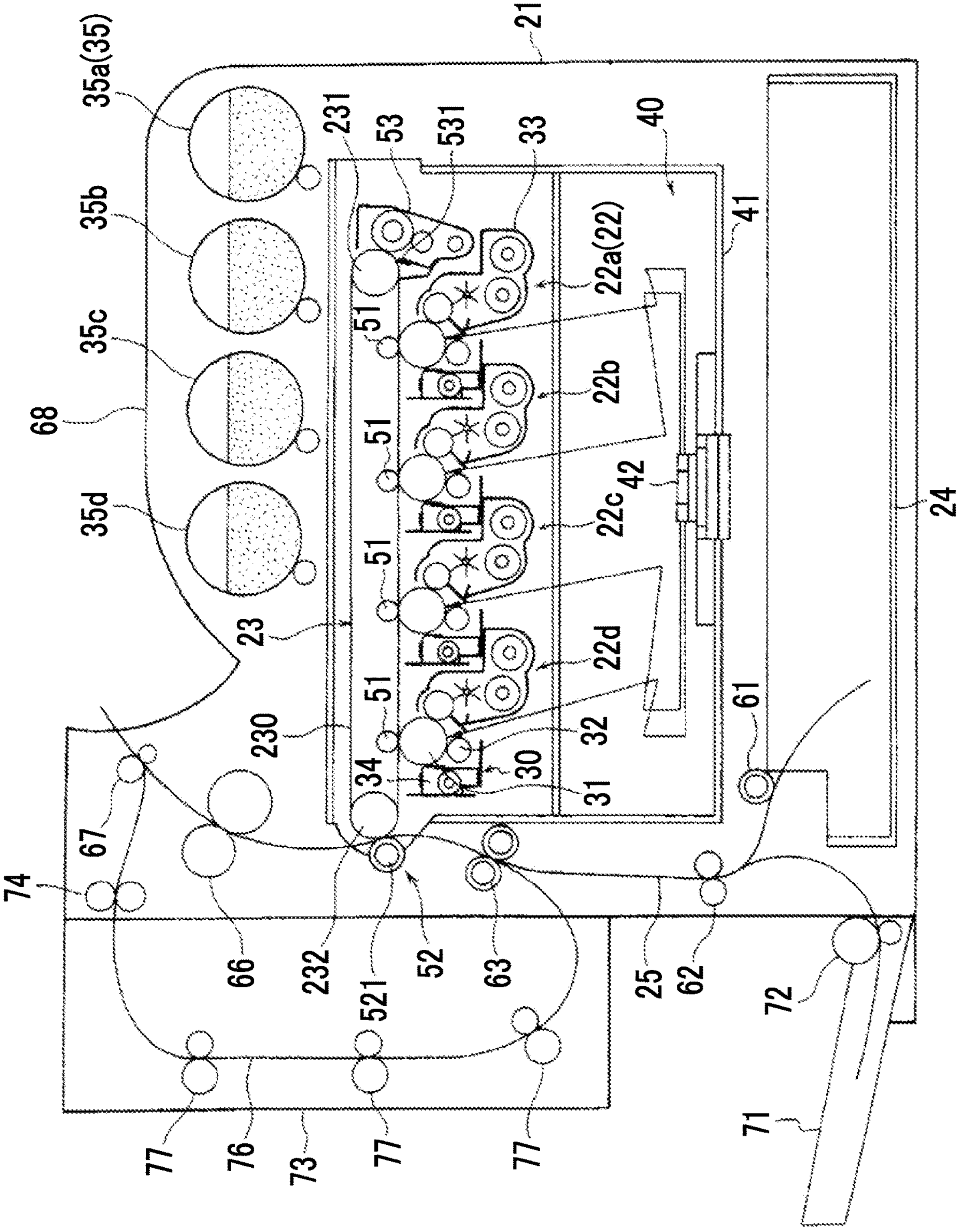
FIG. 4 is a schematic view showing an example of an image forming apparatus according to the present exemplary embodiment.

FIG. 4 is a schematic view showing an example of the image forming apparatus of the present exemplary embodiment, which illustrates a so-called tandem-type image forming apparatus.

In FIG. 4, 21 represents a body housing, 22 and 22*a* to 22*d* each represent an image forming unit, 23 represents a belt module, 24 represents a recording medium supply cassette, 25 represents a recording medium transport path, 30 represents each photoreceptor unit, 31 represents a photoreceptor drum, 33 represents each developing unit, 34 represents a cleaning device, 35 and 35*a* to 35*d* each represent a toner cartridge, 40 represents an exposure unit, 41 represents a unit case, 42 represents a polygon mirror, 51 represents a primary transfer device, 52 represents a secondary transfer device, 53 represents a belt cleaning device, 61 represents a delivery roll, 62 represents a transport roll, 63 represents a positioning roll, 66 represents a fixing device, 67 represents a discharge roll, 68 represents a paper discharge portion, 71 represents a manual feeding device, 72 represents a delivery roll, 73 represents a unit for double-sided recording, 74 represents a guide roll, 76 represents a transport path, 77 represents a transport roll, 230 represents an intermediate transfer belt, 231 and 232 each represent a support roll, 521 represents a secondary transfer roll, and 531 represents a cleaning blade.

In the tandem-type image forming apparatus shown in FIG. 4, image forming units 22 (specifically, 22*a* to 22*d*) of four colors (yellow, magenta, cyan, and black in the present exemplary embodiment) are arranged in the body housing 21. Above the image forming units 22, a belt module 23 is disposed which includes the intermediate transfer belt 230 that is circulated and transported along the arrangement direction of the image forming units 22. The recording medium supply cassette 24 which stores a recording medium (not shown in the drawing) such as paper is disposed at the bottom of the body housing 21, and the recording medium transport path 25 that functions as a transport path of the recording medium from the recording medium supply cassette 24 is disposed in a vertical direction.

In the present exemplary embodiment, the image forming units 22 (22*a* to 22*d*) form, for example, toner images for yellow, magenta, cyan, and black (the arrangement is not necessarily limited to this order) in order from the upstream side in the circulation direction of the intermediate transfer belt 230, each include the photoreceptor unit 30 and the developing unit 33, and include one common exposure unit 40.

The photoreceptor unit 30 is, for example, a unit composed of the photoreceptor drum 31, a charging device (charging roll) 32 preliminarily charging the photoreceptor drum 31, and the cleaning device 34 removing a residual toner on the photoreceptor drum 31 that are integrated into a sub-cartridge.

The developing unit 33 develops an electrostatic latent image formed by exposure in the exposure unit 40 on the charged photoreceptor drum 31 with the corresponding color toner (for example, a negative toner in the present exemplary embodiment), and is integrated with a sub-cartridge consisting of, for example, the photoreceptor unit 30 to configure a process cartridge (so-called Customer Replaceable Unit).

Needlessly to say, the photoreceptor unit 30 may be separated from the developing unit 33 and used as a single process cartridge. In addition, in FIG. 4, the mark 35 (35*a* to 35*d*) represents a toner cartridge for replenishing each color component toner to each developing unit 33 (the toner replenishing path is not shown in the drawing).

The exposure unit 40 includes, for example, four semiconductor lasers (not shown in the drawing), one polygon mirror 42, an imaging lens (not shown in the drawing), and mirrors (not shown in the drawing) corresponding to the respective photoreceptor units 30 that are stored in the unit case 41. The above components are arranged such that the light from the semiconductor laser for each color component is deflected and scanned by the polygon mirror 42, and that the optical image is guided to the corresponding exposure point on the photoreceptor drum 31 via the imaging lens and the mirrors.

In the present exemplary embodiment, the belt module 23 is configured, for example, a pair of support rolls (one of which is a driving roll) 231 and 232 and the intermediate transfer belt 230 that is looped around the support rolls 231 and 232. The primary transfer device (primary transfer roll in the present example) 51 is disposed on the back surface of the intermediate transfer belt 230 corresponding to the photoreceptor drum 31 of each photoreceptor unit 30. A voltage with polarity opposite to the charging polarity of the toner is applied to the primary transfer device 51, such that the toner image on the photoreceptor drum 31 is electrostatically transferred to the side of the intermediate transfer belt 230. Furthermore, a secondary transfer device 52 is disposed at a portion corresponding to the support roll 232 on the downstream side of the lowermost stream image forming unit 22*d* of the intermediate transfer belt 230, and performs secondary transfer (batch transfer) of a primary transfer image on the intermediate transfer belt 230.

In the present exemplary embodiment, the secondary transfer device 52 includes a secondary transfer roll 521 arranged in pressure contact with a toner image-holding surface side of the intermediate transfer belt 230, and a back roll (also functioning as the support roll 232 in the present example) that is disposed on the back surface side of the intermediate transfer belt 230 and forms a counter electrode of the secondary transfer roll 521. For example, the secondary transfer roll 521 is grounded, and a bias having the same polarity as the charging polarity of the toner is applied to the back roll (support roll 232).

In addition, a belt cleaning device 53 is disposed on the upstream side of the uppermost stream image forming unit 22*a* of the intermediate transfer belt 230, and removes a residual toner on the intermediate transfer belt 230.

The recording medium supply cassette 24 is provided with a delivery roll 61 that delivers a recording medium, transport rolls 62 that delivers the recording medium are disposed immediately after the delivery roll 61, and registration rolls (positioning rolls) 63 that supply a recording medium to a secondary transfer site at a predetermined timing is disposed in the recording medium transport path 25 located immediately before the secondary transfer site. The recording medium transport path 25 located at the downstream side of the secondary transfer site is provided with a fixing device 66, discharge rolls 67 for discharging a recording medium are provided on the downstream side of the fixing device 66, and the discharged recording medium is stored in a paper discharge portion 68 formed on the upper part of the body housing 21.

In the present exemplary embodiment, a manual feeding device (MSI) 71 is provided at the lateral side of the body housing 21. The recording medium on the manual feeding device 71 is delivered toward the recording medium transport path 25 by delivery rolls 72 and the transport rolls 62.

Furthermore, a unit 73 for double-sided recording is attached to the body housing 21. When a double-sided mode for recording an image on both surfaces of a recording medium is selected, the unit 73 for double-sided recording reverses the recording medium with an image recorded on one surface by the discharge rolls 67, enters the unit 73 by guide rolls 74 that are immediately in front of the entrance of the unit 73, transports the recording medium along an internal recording medium return transport path 76 by transport rolls 77, and supplies again the recording medium to the side of the positioning rolls 63.

Next, the cleaning device 34 disposed in the tandem-type image forming apparatus shown in FIG. 4 will be specifically described.

Figure 5:
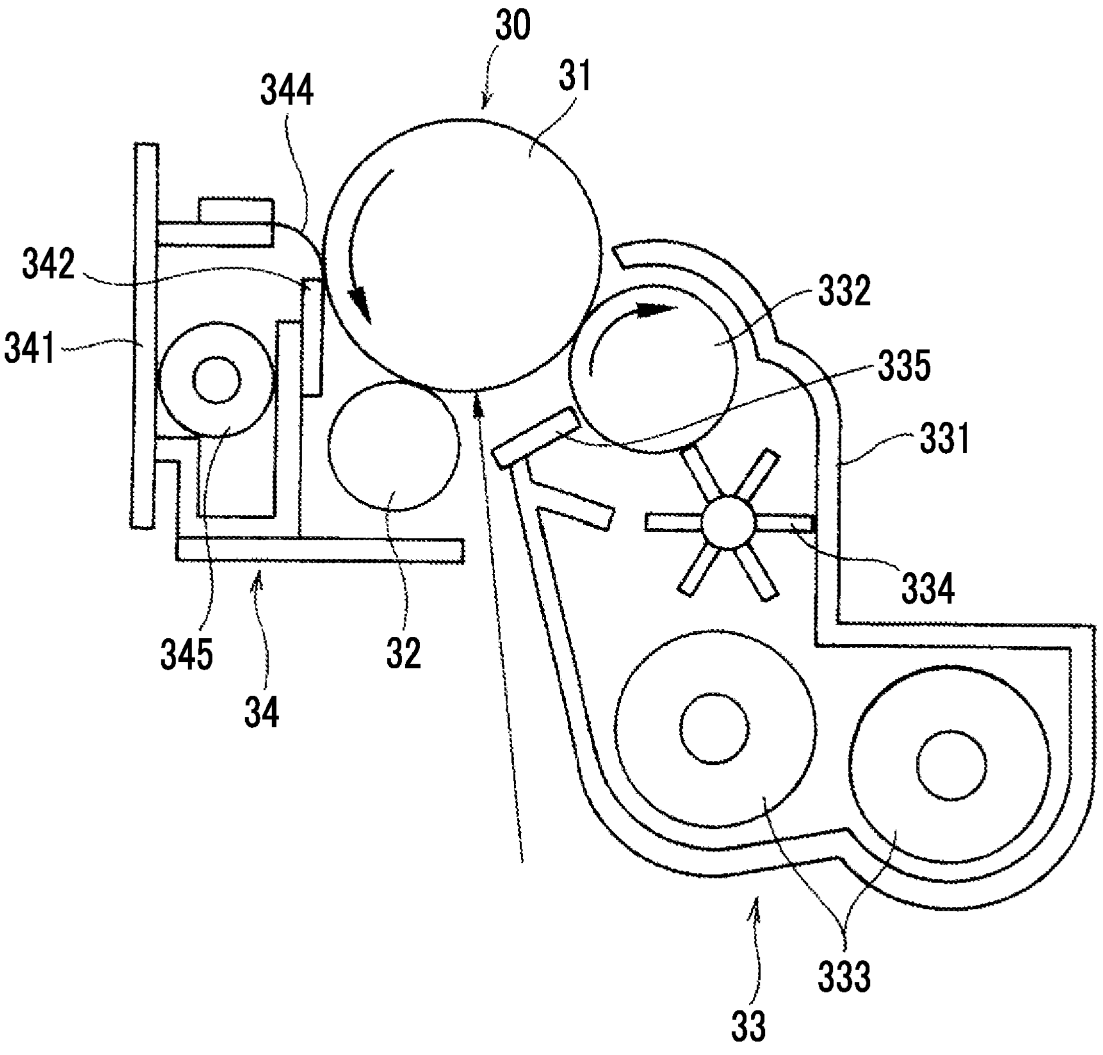
FIG. 5 is a schematic cross-sectional view showing an example of a cleaning device according to the present exemplary embodiment.

FIG. 5 is a schematic cross-sectional view showing an example of the cleaning device of the present exemplary embodiment, which also shows the photoreceptor drum 31 made into a sub-cartridge together with the cleaning device 34 shown in FIG. 4, the charging roll 32, and the developing unit 33.

In FIG. 5, 32 represents a charging roll (charging device), 331 represents a unit case, 332 represents a developing roll, 333 represents a toner transport member, 334 represents a transport paddle, 335 represents a trimming member, 341 represents a cleaning case, 342 represents a cleaning blade, 344 represents a film seal, and 345 represents a transport member.

The cleaning device 34 has the cleaning case 341 that contains a residual toner and opens toward the photoreceptor drum 31. The cleaning blade 342 disposed in contact with the photoreceptor drum 31 is attached to the lower edge of the opening of the cleaning case 341 via a bracket not shown in the drawing, and the film seal 344 that is in contact with the photoreceptor drum 31 in an airtight state is attached to the upper edge of the opening of the cleaning case 341. Note that 345 represents a transport member that guides the waste toner contained in the cleaning case 341 to a waste toner container at the lateral side.

Details of the cleaning blade included in the cleaning device 34 will be described using drawings. FIG. 1 is a schematic cross-sectional view showing an example of the cleaning blade of the present exemplary embodiment, which shows the cleaning blade 342 illustrated in FIG. 5 together with the photoreceptor drum 31 coming into contact with the cleaning blade 342.

In the present exemplary embodiment, in all the cleaning devices 34 of the image forming units 22 (**22*a* to 22*d*), the cleaning blade of the present exemplary embodiment may be used as the cleaning blade 342. The cleaning blade of the present exemplary embodiment may also be used as a cleaning blade 531 used in the belt cleaning device 53**.

As shown in FIG. 5, for example, the developing unit (developing device) 33 used in the present exemplary embodiment has the unit case 331 which contains a developer and opens toward the photoreceptor drum 31. The developing roll 332 is disposed at site facing the opening of the unit case 331, and the toner transport member 333 for agitating and transporting a developer is disposed in the unit case 331. Furthermore, the transport paddle 334 may be disposed between the developing roll 332 and the toner transport member 333.

During development, a developer is supplied to the developing roll 332, and then transported to a developing region facing the photoreceptor drum 31 in a state where the thickness of the developer layer is regulated, for example, by the trimming member 335.

In the present exemplary embodiment, as the developing unit 33, for example, a two-component developer consisting of a toner and a carrier is used. A one-component developer consisting of only a toner may also be used as the developing unit 33.

The operations of the image forming apparatus according to the present exemplary embodiment will be described. First, in a case where each image forming unit 22 (**22*a* to 22*d*) forms a monochromatic toner image corresponding to each color, the monochromatic toner images of the respective colors are sequentially stacked to match the original manuscript information and transferred to the surface of the intermediate transfer belt 230 by primary transfer. Subsequently, the color toner images transferred to the surface of the intermediate transfer belt 230 are transferred to the surface of a recording medium by the secondary transfer device 52, and the recording medium to which the color toner images are transferred undergoes a fixing treatment by the fixing device 66 and is discharged to the paper discharge portion 68**.

In each image forming unit 22 (**22*a* to 22*d*), the residual toner on the photoreceptor drum 31 is cleaned by the cleaning device 34, and the residual toner on the intermediate transfer belt 230 is cleaned by the belt cleaning device 53**.

In the above image forming process, each residual toner is cleaned by the cleaning device 34 (or the belt cleaning device 53).

The cleaning blade 342 may be fixed via a spring material, instead of being directly fixed to a frame member in the cleaning device 34 as shown in FIG. 5.

EXAMPLES

The present invention will be described based on examples, but the present invention is not limited only to these examples. In the following description, "parts" means "parts by mass".

Example 1

A polyester diol having a hydroxyl value of 36 mgKOH/g (TAKELAC U-6230, manufactured by Mitsui Chemicals, Inc.): 100 parts by mass, carbodiimide-modified diphenylmethane diisocyanate having an NCO group content of 30% (TAKENATE LSI-990, manufactured by Mitsui Chemicals, Inc.): 9 parts by mass, a fluorinated acrylic polymer having a hydroxyl value of 175 mgKOH/g (copolymer obtained by polymerizing alkyl methacrylate/hydroxyethyl methacrylate/perfluoroalkyl methacrylate at a molar ratio of 5/6/1:the ratio of a constitutional unit derived from perfluoroalkyl (meth)acrylate to all the constitutional units is 8.3 mol %): 0.1 parts by mass, and 0.1 parts by mass of a polymerization initiator are mixed together, reacted at 110° C. for 2 hours, and then stored at 100° C. for 24 hours, thereby obtaining a cured substance of polyurethane. The obtained cured substance of polyurethane is cut into strips and bonded to a sheet metal holder, thereby obtaining a cleaning blade 1.

Example 2

A cleaning blade 2 is obtained in the same manner as in Example 1, except that instead of the fluorinated acrylic polymer having a hydroxyl value of 175 mgKOH/g in Example 1, a fluorinated acrylic polymer having a hydroxyl value of 280 mgKOH/g (a copolymer obtained by polymerizing alkyl methacrylate/hydroxyethyl methacrylate/perfluoroalkyl methacrylate at a molar ratio of 12/30/1:the ratio of a constitutional unit derived from perfluoroalkyl (meth) acrylate to all the constitutional units is 2.3 mol %) is used.

Example 3

A cleaning blade 3 is obtained in the same manner as in Example 1, except that instead of the fluorinated acrylic polymer having a hydroxyl value of 175 mgKOH/g in Example 1, a fluorinated acrylic polymer having a hydroxyl value of 70 mgKOH/g (a copolymer obtained by polymerizing alkyl methacrylate/hydroxyethyl methacrylate/perfluoroalkyl methacrylate at a molar ratio of 4.5/1.6/1:the ratio of a constitutional unit derived from perfluoroalkyl (meth)acrylate to all the constitutional units is 14.1 mol %) is used.

Example 4

A cleaning blade 4 is obtained in the same manner as in Example 1, except that instead of the fluorinated acrylic polymer having a hydroxyl value of 175 mgKOH/g in Example 1, 0.01 parts by mass of a fluorine-containing surfactant having a hydroxyl group, SURFLON (registered trademark) S-420 (solubility in water <0.1% by volume, manufactured by AGC Seimi Chemical Co., Ltd.), is used.

Example 5

A cleaning blade 5 is obtained in the same manner as in Example 1, except that the amount of the fluorinated acrylic polymer having a hydroxyl value of 175 mgKOH/g in Example 1 added is reduced to 0.01 parts by mass from 0.1 parts by mass.

Example 6

A cleaning blade 6 is obtained in the same manner as in Example 1, except that instead of the fluorinated acrylic polymer having a hydroxyl value of 175 mgKOH/g in Example 1, 0.01 parts by mass of a fluorine-containing surfactant having a hydroxyl group, SURFLON (registered trademark) S-242 (solubility in water >10% by volume, manufactured by AGC Seimi Chemical Co., Ltd.), is used.

Example 7

A cleaning blade 7 is obtained in the same manner as in Example 1, except that instead of the fluorinated acrylic polymer having a hydroxyl value of 175 mgKOH/g in Example 1, a fluorinated acrylic polymer having a hydroxyl value of 155 mgKOH/g (a copolymer obtained by polymerizing alkyl methacrylate/hydroxyethyl methacrylate/perfluoroalkyl methacrylate at a molar ratio of 24/15/0.2:the ratio of a constitutional unit derived from perfluoroalkyl (meth)acrylate to all the constitutional units is 0.5 mol %) is used.

Example 8

A cleaning blade 8 is obtained in the same manner as in Example 1, except that instead of the fluorinated acrylic polymer having a hydroxyl value of 175 mgKOH/g in Example 1, a fluorinated acrylic polymer having a hydroxyl value of 260 mgKOH/g (a copolymer obtained by polymerizing hydroxyethyl methacrylate/perfluoroalkyl methacrylate at a molar ratio of 5/1: the ratio of a constitutional unit derived from perfluoroalkyl (meth)acrylate to all the constitutional units is 16.7 mol %) is used.

Comparative Example 1

A cleaning blade c1 is obtained in the same manner as in Example 1, except that the fluorinated acrylic polymer having a hydroxyl value of 175 mgKOH/g in Example 1 is not added.

Comparative Example 2

A cleaning blade c2 is obtained in the same manner as in Example 1, except that instead of the fluorinated acrylic polymer having a hydroxyl value of 175 mgKOH/g in Example 1, a fluorinated acrylic polymer having a hydroxyl value of 20 mgKOH/g (the copolymerization ratio in Example 1 is changed) is used.

Comparative Example 3

A cleaning blade c3 is obtained in the same manner as in Example 1, except that instead of the fluorinated acrylic polymer having a hydroxyl value of 175 mgKOH/g in Example 1, a fluorinated acrylic polymer having a hydroxyl value of 340 mgKOH/g (the copolymerization ratio in Example 1 is changed) is used.

Comparative Example 4

A cleaning blade c4 is used in the same manner as in Example 1, except that the fluorinated acrylic polymer having a hydroxyl value of 175 mgKOH/g in Example 1 is not added, and that a fluorine-modified isocyanate compound shown in the following structural formula is used instead of the carbodiimide-modified diphenylmethane diisocyanate.

$$CF_3—(CH_2)_2—OCONH—C_6H_5—CH_2—C_6H_5—N{=}C{=}N—C_6H_5—CH_2—C_6H_5—NCO$$

Evaluation of Streaky Image Defects

The cleaning blade of each example is mounted on a Versant 2100 Press manufactured by FUJIFILM Business Innovation Corp., a pressing force NF (Normal Force) is set to 2.0 gf/mm, and an angle W/A (Working Angle) is set to 10°. In a high-temperature and high-humidity environment (30° C., 85% RH), an image having an image density of 1% is printed on 100,000 sheets of A4 paper (210×297 mm, manufactured by FUJIFILM Business Innovation Corp., P paper). Then, a 5000 full halftone image is printed on one sheet of the A4 paper. The occurrence of white streaks on the obtained halftone image is evaluated according to the following standard. The results are shown in the table.

S: No streaky image defects.

A: Although minor streaky image defects are observed in partial regions of the image, the image defects are in an acceptable range.

B: Although minor streaky image defects are observed in a plurality of regions of the image, the image defects are in an acceptable range.

C: Distinct streaky image defects that are at an unacceptable level are observed in a plurality of regions of the image.

TABLE 1

| | Cleaning blade | Evaluation of streaky image defects |
|---|---|---|
| Example 1 | 1 | S |
| Example 2 | 2 | B |
| Example 3 | 3 | B |
| Example 4 | 4 | A |
| Example 5 | 5 | B |
| Example 6 | 6 | B |
| Example 7 | 7 | B |
| Example 8 | 8 | B |
| Comparative Example 1 | c1 | C |
| Comparative Example 2 | c2 | C |
| Comparative Example 3 | c3 | C |
| Comparative Example 4 | c4 | C |

As shown in Table 1, it has been found that the cleaning blades of examples further suppress streaky image defects resulting from the friction between a member to be cleaned and the cleaning blades, compared to the cleaning blades of comparative examples.

(((1))) A cleaning blade, wherein a contact portion that comes into contact with a member to be cleaned is configured with a cured substance of a composition containing a polyisocyanate, a polyol, and at least one of the following (1) or (2):

(1) a fluorine-containing surfactant having a hydroxyl group, and (2) a fluorine-containing polymer having a hydroxyl value of 50 KOH mg/g or more and 300 KOH mg/g or less.

(((2))) The cleaning blade according to (((1))), wherein a content of the fluorine-containing surfactant having a hydroxyl group is 0.01% by mass or more with respect to the polyisocyanate.

(((3))) The cleaning blade according to (((2))), wherein the content of the fluorine-containing surfactant having a hydroxyl group is 0.03% by mass or more and 5.00% by mass or less with respect to the polyisocyanate.

(((4))) The cleaning blade according to any one of (((1))) to (((3))), wherein a content of the fluorine-containing polymer is 0.05% by mass or more with respect to the polyisocyanate.

(((5))) The cleaning blade according to (((4))), wherein the content of the fluorine-containing polymer is 0.20% by mass or more and 20.00% by mass or less with respect to the polyisocyanate.

(((6))) The cleaning blade according to any one of (((1))) to (((5))), comprising:

the fluorine-containing polymer.

(((7))) The cleaning blade according to any one of (((1))) to (((6))), wherein the fluorine-containing polymer is a (meth) acrylic copolymer having a constitutional unit derived from an alkyl (meth)acrylate, a constitutional unit derived from a hydroxyalkyl (meth)acrylate, and a constitutional unit derived from a perfluoroalkyl (meth) acrylate.

(((8))) The cleaning blade according to (((7))), wherein in the fluorine-containing polymer, a ratio of the constitutional unit derived from a perfluoroalkyl (meth) acrylate is 1 mol % or more and 20 mol % or less to all constitutional units.

(((9))) A cleaning device comprising:

the cleaning blade according to any one of (((1))) to (((8))).

(((10))) A process cartridge comprising:

the cleaning device according to (((9))), wherein the process cartridge is detachable from an image forming apparatus.

(((11))) An image forming apparatus comprising:

an image holder;

a charging device that charges the image holder;

an electrostatic latent image forming device that forms an electrostatic latent image on a surface of the charged image holder;

a developing device that develops the electrostatic latent image formed on the surface of the image holder with a toner to form a toner image;

a transfer device that transfers the toner image formed on the image holder onto a recording medium; and the cleaning device according to (((9))) that brings the cleaning blade into contact with the surface of the image holder after transfer of the toner image by the transfer device to perform cleaning.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning blade, wherein a contact portion that comes into contact with a member to be cleaned is configured with a cured substance of a composition containing a polyisocyanate, a polyol, and at least one of the following (1) or (2):

(1) a fluorine-containing surfactant having a hydroxyl group, and (2) a fluorine-containing polymer having a hydroxyl value of 50 KOH mg/g or more and 300 KOH mg/g or less.

2. The cleaning blade according to claim 1, wherein a content of the fluorine-containing surfactant having a hydroxyl group is 0.01% by mass or more with respect to the polyisocyanate.

3. The cleaning blade according to claim 2, wherein the content of the fluorine-containing surfactant having a hydroxyl group is 0.03% by mass or more and 5.00% by mass or less with respect to the polyisocyanate.

4. A cleaning device comprising:

the cleaning blade according to claim 3.

5. A process cartridge comprising:

the cleaning device according to claim 4, wherein the process cartridge is detachable from an image forming apparatus.

6. A cleaning device comprising:

the cleaning blade according to claim 2.

7. A process cartridge comprising:

the cleaning device according to claim 6, wherein the process cartridge is detachable from an image forming apparatus.

8. The cleaning blade according to claim 1, wherein a content of the fluorine-containing polymer is 0.05% by mass or more with respect to the polyisocyanate.

9. The cleaning blade according to claim 8, wherein the content of the fluorine-containing polymer is 0.20% by mass or more and 20.00% by mass or less with respect to the polyisocyanate.

10. A cleaning device comprising:

the cleaning blade according to claim 9.

11. A cleaning device comprising:

the cleaning blade according to claim 8.

12. The cleaning blade according to claim 1, comprising:

the fluorine-containing polymer.

13. A cleaning device comprising:

the cleaning blade according to claim 12.

14. The cleaning blade according to claim 1, wherein the fluorine-containing polymer is a (meth) acrylic copolymer having a constitutional unit derived from an alkyl (meth)acrylate, a constitutional unit derived from a hydroxyalkyl (meth)acrylate, and a constitutional unit derived from a perfluoroalkyl (meth) acrylate.

15. The cleaning blade according to claim 14, wherein in the fluorine-containing polymer, a ratio of the constitutional unit derived from a perfluoroalkyl (meth) acrylate to all the constitutional units is 1 mol % or more and 20 mol % or less.

16. A cleaning device comprising:

the cleaning blade according to claim 15.

17. A cleaning device comprising:

the cleaning blade according to claim 14.

18. A cleaning device comprising:

the cleaning blade according to claim 1.

19. A process cartridge comprising:

the cleaning device according to claim 18, wherein the process cartridge is detachable from an image forming apparatus.

20. An image forming apparatus comprising:

an image holder;

a charging device that charges the image holder;

an electrostatic latent image forming device that forms an electrostatic latent image on a surface of the charged image holder;

a developing device that develops the electrostatic latent image formed on the surface of the image holder with a toner to form a toner image;

a transfer device that transfers the toner image formed on the image holder onto a recording medium; and the cleaning device according to claim 9 that brings the cleaning blade into contact with the surface of the image holder after transfer of the toner image by the transfer device to perform cleaning.

* * * * *